June 14, 1955 L. HENSLER 2,710,744
APPARATUS FOR MIXING ROAD SURFACING MATERIALS
Filed Sept. 17, 1952 3 Sheets-Sheet 1

INVENTOR:
LOUIS HENSLER.
BY
Wm. A. Ballard
ATTY.

June 14, 1955 L. HENSLER 2,710,744
APPARATUS FOR MIXING ROAD SURFACING MATERIALS
Filed Sept. 17, 1952 3 Sheets-Sheet 2

INVENTOR:
LOUIS HENSLER.
BY
Wm. O. Ballard
ATTY.

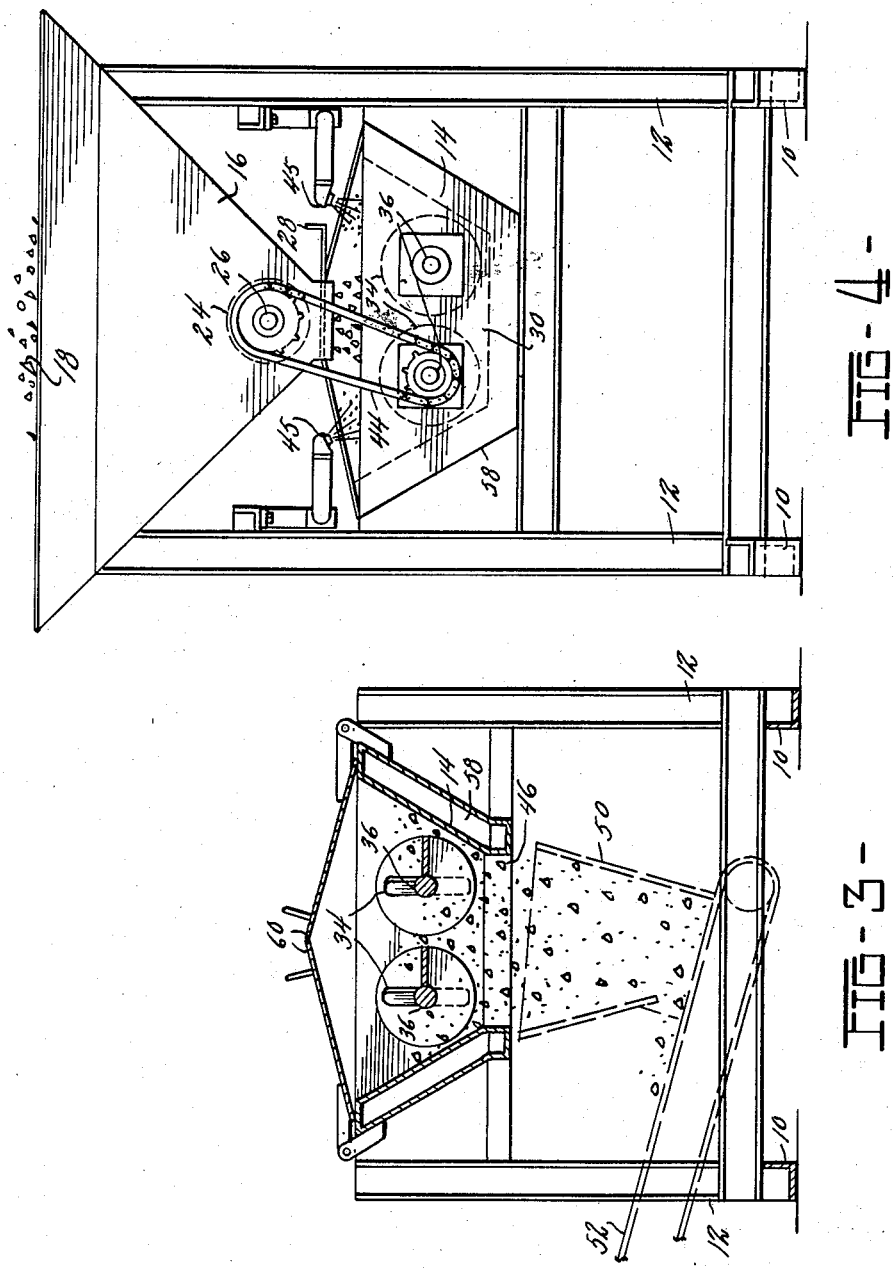

United States Patent Office 2,710,744
Patented June 14, 1955

2,710,744

APPARATUS FOR MIXING ROAD SURFACING MATERIALS

Louis Hensler, Coldwater, Mich.

Application September 17, 1952, Serial No. 310,035

1 Claim. (Cl. 259—157)

This invention relates to road surfacing material mixing apparatus.

An object of this invention is to provide a portable mixing apparatus which may be readily transported to a location adjacent a primary material source, and process such material for use in surfacing roads.

Another object of this invention is to provide a material mixing apparatus capable of handling a continuous supply of large capacity in a minimum of time.

Another object of this invention is to provide a portable mixing apparatus capable of compounding either hot or cold road surfacing mixes.

Another object of this invention is to provide a portable mixing apparatus for mixing aggregates, such as gravel, stone and sand, with liquids, mastics, and semi-liquid substances, such as tars, emulsions and the like.

And another object of this invention is to provide an apparatus for receiving a supply of basic road surfacing materials, mixing the same, and delivering a continuous supply of a ready-for-use mixtures.

Other objects and advantages of this invention relating to the arrangement, operation and functions of the related elements of the structure, to various details of construction, to combination of parts and to economies of manufacture, will be apparent to those skilled in the art upon consideration of the following description and appended claim, reference being had to the accompanying drawings forming a part of this specification wherein like reference characters designate corresponding parts in the several views.

Referring to the drawings:

Fig. 3 is a view on the line III—III, Fig. 1; and

Fig. 4 is an end view of the apparatus from the right of Fig. 1.

Figure 1:
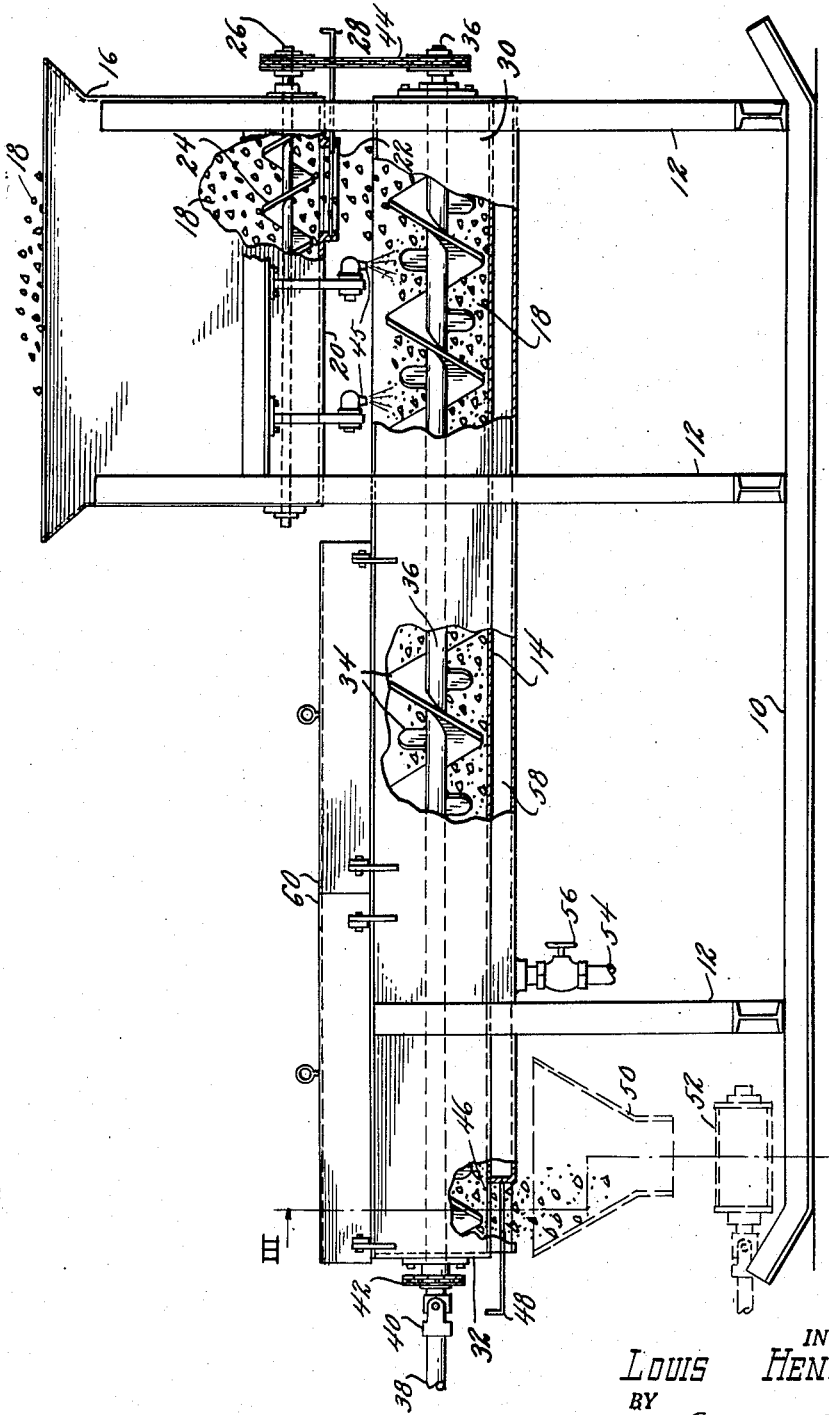
Fig. 1 is a side elevation of an apparatus embodying the invention herein.
Figure 2:
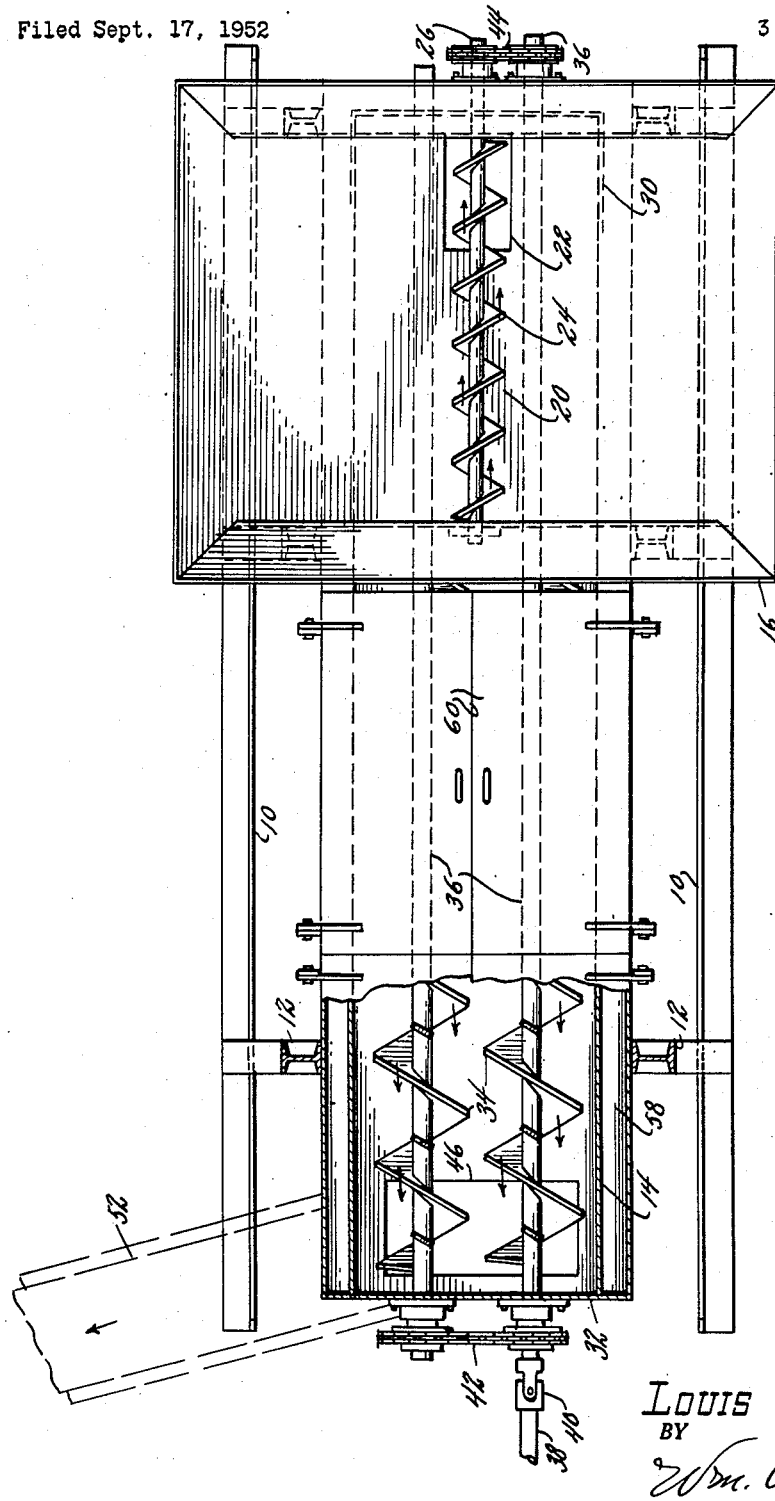
Fig. 2 is a plan view of the apparatus of Fig. 1.

In that it is desirable to position the apparatus herein adjacent a major material supply, such as a gravel pit or quarry, and move the same thereabout, the apparatus includes a pair of skids 10 from which rises a framework including uprights 12, mounting a horizontally disposed mixing box 14 above the skids 10. A portion of the uprights 12 serve to not only support one end of the mixing box 14, but extend upwardly therebeyond to provide supports for hopper 16. This hopper 16 is fixed above one end of the mixing box 14 and has a V-shaped lateral cross-section. The material 18, such as gravel, stand, stone and the like, may be intermittently deposited into the hopper 16 directly from a primary source. Such material as deposited into the hopper 16 is moved along the bottom 20 of the hopper to a discharge port 22 by means of a screw conveyor element 24, having shaft 26 extending outwardly from the hopper. The aperture 22 is provided with a slide valve plate 28 which may be manually adjusted to control the flow of material 18 therethrough to fall by gravity into and adjacent the extreme end 30 of the mixing box 14. The material 18 falling into the mixing box 14 is moved from the box end 30 to the remote or opposite end 32 by means of a pair of screw conveyors 34. These screw conveyors not only move the material longitudinally along the box 14, but agitate the same throughout the extent of the movement along the mixing box. These screw conveyors 34 are provided with shafts 36.

Power is delivered for operating the screw conveyors from a motor (not shown) to drive shaft 38 connected by a universal joint 40 to one of the shafts 36. The other shaft 36 may be positively driven through a chain belt connection 42, and the shaft 26 is driven by a chain belt connection 44 between a shaft 36 and the shaft 26.

The primary road surfacing material 18 is deposited into the mixing box 14 at its extreme end 30, and in the initial movement of such material toward the opposite end, such material may be sprayed with other road surfacing components, such as tars and the like, by means of nozzles 45 mounted by the main frame and directed to spray the material 18 adjacent the end 30 of the mixing box. This allows a thorough mixing of the solids and liquids during their progress longitudinally throughout the length of the mixing box 14, to be delivered to an aperture 46 through the end 32 of the box 14, the flow of the mixed material therethrough being controlled by a slide valve 48 which regulates the delivery volume from the box 14 into a chute 50 for directing the mixed material onto a portable conveyor 52, which in turn may carry the mixed material directly to its place of use or into trucks for transportation to its ultimate destination.

The mixing device may be located adjacent the primary material supply of the mixed material to be supplied to an area thereabout. This reduces the hauling expense for base material by reducing the handling costs thereof.

The apparatus herein can be used for mixing a wide range of materials, such as a cold mix of gravel and emulsion, or a hot mix may be delivered from the apparatus by connecting line 54 to a steam supply and controlling the same by valve 56 to steam jacket 58 about the mixing box 14. In the production of a hot mix, hinged covers 60 may be closed to cover the mixing box between the hopper 16 and the delivery outlet 46 to provide a heating chamber for the mixing operation.

The apparatus has a year-round use and may be employed for mixing sand, and melt-producing substances such as calcium chloride to be spread upon the highways during the winter season.

The apparatus, being portable, may be placed in strategic locations, and a small number of the machines may adequately service the highways covering an extensive area and provide a ready source of supply for small patch batches, or may deliver a large capacity for supplying major road resurfacing projects.

A device of the type herein shown may be driven by a portable power supply, such as an internal engine having a rating of approximately 250 H. P., and with such a drive can supply up to 50 tons per hour of mixed repair and surfacing materials. This capacity may be obtained and controlled by a single operator, and the portable conveyor 52 can be operated on additional projects apart from co-operating with the apparatus herein.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed and it is desired to secure by United States Letters Patent:

A portable apparatus for mixing road surfacing materials adjacent the area within which said materials are to be used, said apparatus including a pair of skids, a frame mounted on said skids including uprights from spaced locations intermediately along said skids, a hopper mounted atop a portion of said uprights, said hopper provided with a discharge port, a valve for regulating the flow of material through said port, means in said hopper for moving the material therein toward said port, an elongated mixing trough carried by said uprights, one end thereof being supported intermediately the hopper carrying uprights and below said port to receive the material discharged from the hopper, said mixing trough having a discharge port at its remote end, means for moving said material along said trough from its receiving end to discharge port, said means mixing said material during its movement along the trough, a steam jacket about the bottom of said trough, a hinged cover for the top of said trough, a drive for said material mixing means, transmission means connecting said material mixing means with the means for moving the material in said hopper, and spray means carried by said hopper directly into said trough.

References Cited in the file of this patent

UNITED STATES PATENTS

| | | |
|---|---|---|
| 690,374 | Pearce | Dec. 31, 1901 |
| 976,363 | Hinkhouse | Nov. 22, 1910 |
| 1,546,335 | Browne | July 14, 1925 |
| 1,575,458 | Stonesifer | Mar. 2, 1926 |
| 2,445,928 | Sommer | July 27, 1948 |

FOREIGN PATENTS

| | | |
|---|---|---|
| 613,992 | Germany | May 28, 1935 |